United States Patent Office 3,806,478
Patented Apr. 23, 1974

3,806,478
POLYMERIC DISPERSIONS STABILIZED BY CELLULOSIC PRECURSORS
Said K. Mansour and John W. Rehfuss, Louisville, Ky., assignors to Celanese Coatings Company, New York, N.Y.
No Drawing. Continuation-in-part of abandoned application Ser. No. 30,350, Apr. 20, 1970. This application Apr. 19, 1972, Ser. No. 245,393
Int. Cl. C08b *21/08, 21/14, 27/34*
U.S. Cl. 260—17 A                                12 Claims

ABSTRACT OF THE DISCLOSURE

Novel synthetic polymeric dispersions comprising an organic liquid medium, a dispersed polymer of ethylenically unsaturated monomers and a cellulosic dispersion stabilizer are prepared. In the dispersion the cellulosic precursor is at least swollen by the organic liquid medium while the polymer is substantially insoluble in this medium. These dispersions are useful especially in their pigmented form in preparing protective coatings for various substrata.

CROSS-REFERENCE TO RELATED APPLICATION

This is a continuation-in-part of application Ser. No. 30,350, filed Apr. 20, 1970, now abandoned.

BACKGROUND OF THE INVENTION

This invention relates to polymeric dispersions in various organic liquid media and to the processes for preparing same.

Polymeric dispersions are well known in the art and have been shown to possess several unique improvements over standard solution vinylidene polymer lacquers or enamels. Including among these advantages are lower cost solvents, higher handling solids and molecular weight and improved viscosity control.

Various substances have been suggested as useful in stabilizing polymeric dispersions. For example, in U.S. Pat. 3,095,388, rubber is disclosed as a useful dispersion stabilizer; in U.S. Pat. 3,198,759, a dibasic acid modified alkyd resin is disclosed, in U.S. Pat. 3,218,287, a monobasic aliphatic acid modified polymer is used; in U.S. Pat. 3,232,903, homopolymers of 4–18 carbon alkyl esters of methacrylic or acrylic acid are disclosed; in U.S. Pat. 3,255,135, oxidized vegetable and animal oils are disclosed as useful in forming stable polymeric dispersions; and U.S. Pat. 3,365,414 discloses the use of alkylated melamine resins as stabilizers for hydroxy or acid containing polymeric dispersions. However any of these previously disclosed polymeric dispersions exhibit extreme tendencies to crater when applied as a coating.

SUMMARY OF INVENTION

It has now been found that by preparing polymeric dispersions according to the methods and compositions hereinafter described, it is possible to obtain pigmented films, which are useful on all types of substrata, and exhibit little or no cratering. These pigmented films have light, uniform colors and exceptional gloss.

The polymeric dispersions of this invention contain organic liquid medium, a cellulosic precursor or stabilizer and a dispersion polymer of ethylenically unsaturated monomers. In this dispersion the cellulosic precursor acts to maintain the dispersion polymer in a dispersed or dispersable state. The organic liquid medium is selected so that the polymer is substantially insoluble therein, but so that the cellulosic precursor is at least swollen thereby. In other words, the cellulosic precursor is either soluble in this medium or at least swollen by the action of the medium thereon.

The dispersions of this invention are prepared by polymerizing ethylenically unsaturated monomers in the presence of a cellulosic stabilizer and an organic liquid medium. This process results in a polymer which is uniformly dispersed in the medium.

DESCRIPTION OF INVENTION

Liquids which can be used as the organic medium of this invention can be present as a single compound or in mixtures and can be aliphatic, aromatic or naphthenic. Likewise these liquids can contain alcohol, phenol, carboxylic acid, ester, ether or ketone groups. Included are nitropropane, pentane, n-hexane, cyclohexane, n-heptane, n-octane, iso-octane, benzene, toluene and xylene. Also included are commercially available hydrocarbon mixtures such as mineral spirits, gasoline, pine oil, xylene mixtures, solvent naphthas, VM & P naphthas, octane fractions and the like. Among the functional group containing organic liquids are included: the alcohols such as methanol, ethanol, the propanols, the butanols, diacetone alcohol, etc.; the phenols such as phenol and cresole; the liquid carboxylic acids such as acetic acid, acrylic acid, methacrylic acid and the like; the esters such as butyl acetate, ethyl acetate, Cellosolve acetate, butyl Carbitol acetate, etc.; the ethers, such as ethyl Cellosolve, methyl Cellosolve, butyl Cellosolve, Carbitol and the like and the ketones such as methyl ethyl ketone, methyl isobutyl ketone, acetone, diethyl ketone, cyclohexanone, etc. In addition to the above listed materials small amounts—up to about 30% based upon medium composition—of other liquids such as water, dimethyl formamide, carbon tetrachloride, and dimethyl sulfoxide can be used. Furthermore, any of the monomers listed hereinafter can also be used as the organic medium of this invention.

It is essential that the organic medium which is used be liquid at the temperature at which polymerization of the monomers used herein occurs. However, the useful liquids can have a wide range of boiling points depending largely upon the end use of the particular dispersion. Suitable dispersions can be prepared when the liquid medium has a boiling point from about 100° F. to about 500° F. For most purposes though, a boiling point range of about 200° F. to about 450° F. is preferred.

When selecting a particular organic medium the solubility of both the cellulosic precursor and the polymer which is to be dispersed must be considered. The dispersed polymer itself should be substantially insoluble in the organic medium, i.e., not more than about 10% by weight soluble therein. Levels higher than this can lead to high viscosity dispersions. On the other hand the cellulosic precursor should be at least swollen by the above organic media. By at least swollen, it is meant that the organic medium should either solubilize the cellulosic material or at least act to swell or puff it. In instances where the cellulosic material is insoluble in the liquid organic media, unstable grainy dispersions usually result. Preferably, the cellulosic precursor should be substantially soluble in the organic liquid used herein.

The viscosity of the finished dispersion can be controlled by a careful selection of the organic medium mixture. For example, a very low viscosity dispersion prepared in a naphtha liquid can be converted to a higher viscosity dispersion by replacing various amounts of the naphtha with a higher solvency organic liquid such as an ester, ketone, or alcohol.

The preferred organic media useful herein are the various mixtures of solvent or VM & P naphthas and alcohols, ketones, esters or highly aromatic organic liquids. This mixture is particularly preferable where the dispersion is to be applied by spraying over a metal or primed metal substrate. Such mixtures, while generally inexpensive, give excellent spray properties with rapid evaporation rates.

The cellulosic precursors useful in stabilizing the polymeric dispersions prepared herein can be represented by the general formula:

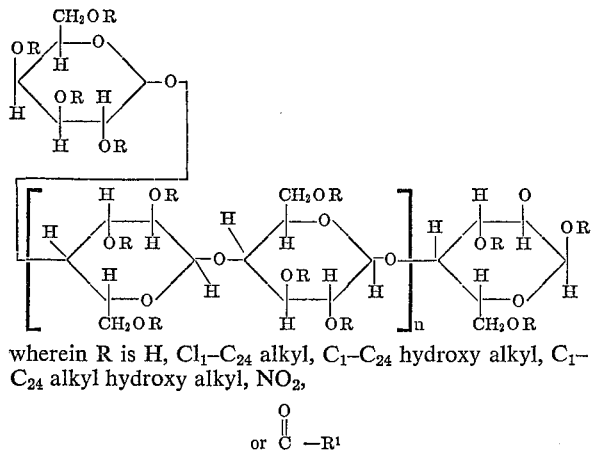

wherein R is H, $Cl_1$–$C_{24}$ alkyl, $C_1$–$C_{24}$ hydroxy alkyl, $C_1$–$C_{24}$ alkyl hydroxy alkyl, $NO_2$, $$\text{or } \overset{O}{\underset{}{\overset{\|}{C}}} -R^1$$

where $R^1$ is $C_1$–$C_{24}$ alkyl. Thus the various cellulosic materials can include: cellulose, cellulose nitrate, the ethers such as the methyl, ethyl, propyl, butyl, amyl, hexyl, heptyl, stearyl or lauryl celluloses, etc.; the hydroxy ethers such as hydroxy ethyl cellulose, hydroxy propyl cellulose, etc.; the alkyl hydroxy alkyl ethers such as ethyl hydroxy ethyl cellulose; and the esters such as cellulose acetate, cellulose propionate, cellulose butyrate, cellulose decanoate, cellulose stearate, and the like. The above listing is not meant to exclude the mixed cellulosic reaction products such as cellulose acetate stearate, cellulose acetate butyrate, methyl ethyl cellulose, etc.

Other cellulosic compounds useful in preparing the dispersions of this invention include modified reaction products of any of the above described cellulosics. For example, those cellulosic compounds containing unreacted hydroxyl groups such as the partial cellulose ethers or esters or the hydroxy alkyl cellulosic ethers can be modified by reaction with hydroxyl reactive materials such as compounds containing carboxy acids, anhydrides, acid chlorides, diisocyanates, epoxides, etc.

Generally the molecular weight of the cellulosic materials used above can vary from near 50,000 to essentially that of the dimer cellobiose, where in the above formula, $n=0$.

Preferred among the cellulosic compounds are the cellulosic ethers or esters. Most preferred are cellulose acetate butyrate, cellulose acetate stearate, cellulose acetate decanoate, ethyl cellulose and lauryl cellulose.

The amount of cellulosic material that can be used as a stabilizer for the polymeric synthetic dispersions of this invention can vary from about 0.2 to 20 weight percent based on the total weight of stabilizer and polymer solids. When less than about 0.2 weight percent cellulosic precursor or stabilizer is used, the resulting dispersions are unstable and have grainy films. On the other hand when levels in excess of 20 weight percent are used the resulting dispersions are heavy and require a reduction in solids to such an extent that their use is impractical. Most preferably the precursor or stabilizer level should be in the range of 0.5 to 5.0 weight percent.

The above cellulosic precursors can be used in admixture with other precursors well known in the art including oxidized vegetable or animal oils, long chained alkyl acrylate or methacrylate homopolymers, e.g., polylauryl methacrylate, natural or synthetic rubbers, various fatty acid modified polyester resins, and the like.

The various ethylenically unsaturated monomers which can be formed into the dispersed phase polymers of this invention can be selected from a wide variety of acrylic and vinyl monomers such as the vinyl esters of fatty acids having from 1 to 18 carbon atoms including vinyl acetate, vinyl propionate, vinyl butyrate, vinyl laurate, vinyloleate, and vinyl stearate. Esters of acrylic acid or of methacrylic acid with alcohols having from 1 to 18 carbon atoms can likewise be employed. Examples include methyl acrylate or methacrylate, ethyl acrylate or methacrylate, propyl acrylate or methacrylate, isopropyl acrylate or methacrylate, the various butyl acrylates or methacrylates, cyclohexyl acrylate or methacrylate, benzyl acrylate or methacrylate, phenyl acrylate or methacrylate, n-hexyl, 2-ethyl hexyl, n-octyl, t-octyl, dodecyl, hexadecyl, or octadecyl acrylates or methacrylates. Acrylonitrile, methacrylonitrile, acrylamide, methacrylamide styrene, α-methyl styrene, vinyl toluenes, acrylic acid, acrylic acid anhydride, methacrylic acid, methacrylic acid anhydride, maleic anhydride, fumaric acid, crotonic acid, allyl acetate, glycidyl methacrylate, t-butylaminoethyl methacrylate, hydroxyalkyl acrylates, or methacrylates such as β-hydroxyethyl methacrylate, β-hydroxypropyl methacrylate, β-hydroxyethyl vinyl ether, β-hydroxyethyl vinyl sulfide, vinyl pyrrolidone, N,N - dimethylaminoethyl methacrylate, ethylene, propylene, vinyl chloride, vinyl fluoride, vinylidene fluoride, hexafluoropropylene, chlorotrifluoroethylene, and tetrafluoroethylene can also be used as the monomers for making dispersed polymer phase. The preferred monomers for use in this invention are the alkyl acrylates and methacrylates. Most preferred among these monomers, especially when the end use of the dispersion is in automotive coatings, is methyl methacrylate or mixtures containing a major amount of methyl methacrylate and a minor amount of a flexibilizing monomer such as butyl acrylate, ethyl acrylate, etc.

The basic process for preparing the dispersion of this invention comprises addition polymerizing any of the above described ethylenically unsaturated monomers to a polymeric dispersed state in an organic liquid medium in the presence of any of the previously described cellulosic materials. Compounds useful in initiating the formation of the above dispersed addition polymers include those known in the art as free radical catalysts or initiators. These catalysts are generally of the azo or peroxygen type and include benzoyl peroxide, lauroyl peroxide, acetyl peroxide, cumene hydroperoxide, paramethane hydroperoxide, azodiisobutyronitrile, dimethyl azodiisobutyrate, tertiary butyl peroctoate, tertiary butyl perbenzoate, ditertiary butyl peroxide, methyl ethyl ketone peroxide, hydrogen peroxide, and so on. Free radical catalysts which are activated by means of amines such as triethylenetetraamine and those activated by various salts such as cobalt naphthenate are also suitable. In general any free radical catalyst that can be used for solution or bulk polymerization of the monomers described above can be employed in the present invention. The amount of catalyst that is used can be from about 0.1% to about 5.0% of the monomer weight. Generally, the catalyst can be added all at once or in portions at periodic intervals. Preferred among the above free radical catalysts is tertiary butyl peroctoate.

Instead of employing a free radical polymerization initiation system, a cationic initiation system can be used. Useful examples of this type include the conventional Friedel-Crafts or Lewis acid catalysts such as aluminum chloride, stannic chloride, boron fluoride and its complexes such as the etherates, titanium tetrachloride, aluminum bromide, sulfuric acid and the like. The preferred amount of catalyst or initiator used in this system is about 0.1 to 2.0% based on the total monomer content.

Still other useful types of polymerization catalysts include the anionic systems. The catalysts useful in forming these systems include materials such as butyllithium, butyl magnesium bromide, phenyl magnesium bromide, triphenyl methyl sodium, sodium naphthalene, 9-fluorenyllithium, dipotassium stilbene, etc. The proportion of this catalyst preferably is in the range of from about 0.1 to 5% based on the weight of the monomers.

Many well known methods of polymerization can be employed in preparing the dispersions of this invention. In the simplest method the cellulosic material is added to the organic medium along with a portion of the polymerization initiator or catalyst. This mixture is then heated to the desired temperature (anywhere between room temperature and the reflux temperature of the organic medium depending upon the reactivity of the particular catalyst) and held at this temperature for the desired length of time. (Preferably polymerization is carried out at a temperature of about 125° F. to 250° F.) The monomers are then added over from about 15 minutes to 4 hours or longer and the polymerization mixture is held at reaction temperature until polymerization is complete as evidenced by a minimal concentration of free unreacted monomer. Variations on this procedure include (1) heating the cellulosic-organic medium mixture to the desired temperature and then concurrently adding the monomers and the initiator over a predetermined period of time at the desired temperature; (2) adding a portion of the monomers to the cellulosic-organic medium-initiator mixture, holding this mixture at the desired temperature for a predetermined amount of time and then adding the remainder of the monomers and in some instances additional amounts of the initiator; (3) mixing the monomers, cellulosic material, organic medium, and initiator, heating this mixture to reaction temperature and holding for complete monomer conversion; and (4) forming a mixture as in number (3) except without the initiator and then heating the mixture to reaction temperature and adding the initiator over the desired length of time. However the preferred process is carried out in 3 separate steps. In the first step the cellulosic precursor, the organic medium and a portion of the initiator or catalyst are mixed and heated to reaction temperature. A portion of the monomers is then added as the second step. Finally an addition of the remainder of the organic medium, initiator and monomers is carried out as the third step. Variations on this preferred process include replacing the organic medium with a portion of the monomers in the first step and then carried out as the second step an addition of a portion of the organic medium. In other variations the first step can include only the cellulosic precursor and a portion of the monomers while the second step includes a mixture of portions of both the organic medium and the initiator. Using any of the above procedures it may be necessary in order to increase the amount of monomer conversion to add additional amounts of catalyst or initiator after all of the initial catalyst has been added. Furthermore other variations on these procedures are possible and are well known in the art.

Chain transfer agents are in most cases not required in order to form the dispersions of this invention. Preferably, however, they should be included in order to control the molecular weight and molecular weight distribution of the dispersed phase polymer, i.e., the polymer formed of the above described ethylenically unsaturated monomers. Included among these chain transfer agents are phenol, chloroform and carbon tetrachloride. Also included are mercaptans such as n-propyl mercaptan, n-butyl mercaptan, tertiary butyl mercaptan, n-octyl mercaptan, n-dodecyl mercaptan, tertiary dodecyl mercaptan, lauryl mercaptan, ethyl thio ethanol, thiophene, thiophenol, toluene thiol, xylene thiol, phenyl disulfide, thioanisole, 4-tertiary butyl thiophenol and 4-nonyl thiophenol. Preferred among these chain transfer agents are aliphatic mercaptans especially those which are soluble in the organic medium, e.g., lauryl mercaptan. Although these chain transfer agents can be present in amounts varying from 0.1 to 1.5 weight percent based upon the total dispersion solids, best results are obtained when they are present in the 0.25 to 0.75 weight percent range. These chain transfer agents can be added at any time during the course of the dispersion formation. However, in the preferred instances they are added along with the ethylenically unaturated monomers.

The polymeric dispersions of the present invention are adapted to be modified by the incorporation of drying oils, fillers as well as plasticizers, coalescing aids and polymeric or resinous materials which are soluble in the organic medium incuding fatty acid modified shellac, gums, natural resins, epoxidized fatty oils, coal tar, cumarone-indene resins, asphalts, bitumens, epoxy resins, alkylated methylolated aminoplast resins including condensations of formaldehyde with urea, melamine, thiourea, benzoguanamine, ethyleneurea alkylated with a 1 to 6 carbon alcohol such as butanol. Among other materials that can be incorporated are the alkyd resins and organic soluble vinyl and acrylic resins with or without plasticizers.

Dispersions formed in this manner are usually milky white in color and have excellent properties when applied in their pigmented form over metal or primed metal. These pigmented dispersions which are prepared using normal pigments and pigmentation methods are of special use in automotive top coating, coil coating, can coating and other metal decorating areas. However, they can also be applied to any conventional substrate such as glass, plastic, wood paper or leather by any of the several conventional application methods, e.g., brushing, spraying, dip-coating, or electro-coating. After application the dispersions of this invention can be baked at from about 100° F. to 400° F. for about 1 minute to 1 hour (preferably about 15–30 minutes at about 220° F.–320° F.) to produce coatings which have exceptional flow properties and which are essentially free from craters and other surface imperfections.

In the following examples parts and percentages unless otherwise noted are understood to be by weight.

Example 1

Into a reaction flask equipped with a mechanical agitator, thermometer, reflux condenser and addition funnel were added 25 parts of a cellulose acetate butyrate obtained from the Eastman Chemical Co. as EAB 551–0.2 having a falling ball viscosity (ASTM D–1343–56) of 0.2 seconds, an acetyl content 2.0 weight percent and a butyryl content 53.0 weight percent and 75 parts of methyl methacrylate. This mixture was heated to 180° F. and a mixture of 100 parts of ethyl acetate, 20 parts of VM & P naphtha and 5.0 parts of tertiary butyl perocto-ate were added over 15 minutes. The resulting mixture was held at 185° F. for 30 minutes and a mixture of 150 parts of methyl methacrylate, 5.0 parts of tertiary butyl peroctoate and 120 parts of VM & P naphtha was added over thirty minutes. After this addition the reaction mixture was held at 184° F.–186° F. for 2 hours resulting in a stable, seed free, dispersion. Smooth, seed-free films resulted when films were cast on steel using this dispersion Example 2

Into a reaction flask equipped as in Example 1 were added 50.0 parts of the cellulose acetate butyrate described in Example 1 and 75 parts of methyl methacrylate. This mixture was agitated at room temperature until it became clear and was then heated to 180° F. At this point a mixture of 100 parts of butyl acetate, 20 parts of VM & P naphtha and 5.0 parts of tertiary butyl peroctoate was added. Thirty minutes later at a temperature of 189° F. the addition of a mixture of 125 parts of methyl methacrylate, 120 parts of VM & P naphtha and 5.0 parts of tertiary butyl peroctoate was begun and carried out over 30 minutes. After holding the resulting reaction mixture at 184° F.–186° F. for two hours, a smooth somewhat thick polymeric dispersion resulted.

Example 3

Into a reaction flask equipped as in Example 1 were added 15 parts of a practical grade of cellulose tridecanoate, available from Distillation Products Industries, Inc., designated as P7137, having a relative solution viscosity of 1.1175, 45 parts of methyl methacrylate and three parts of tertiary butyl peroctoate. Relative solution viscosity (RSV) is defined as the quotient obtained by dividing the efflux time of a solution of 0.25 gram of the material to be tested dissolved in 50 ml. of ethylene dichloride by the efflux time of ethylene dichloride, the efflux time being measured in accordance with the procedure of A.S.T.M. D445–46T method B at 25° C. using a modified Ostwald-Fenske viscometer, size 50. This mixture was heated to 180° F. and 72 parts of VM & P naphtha were added over 15 minutes. After holding the resulting mixture for 30 minutes at 183° F. a mixture of 72 parts of VM & P naphtha, 90 parts of methyl methacrylate and 3.0 parts of tertiary butyl peroctoate was added over 30 minutes. After holding the resulting reaction mixture for 2½ hours a smooth, seedless dispersion resulted.

Example 4

A reaction flask equipped as in Example 1 containing a mixture of three parts of a cellulose acetate stearate available from Distillation Products Industries, Inc., designated as 4531 having an RSV as defined in Example 3 of 1.0533, 72 parts of VM & P naphtha and three parts of tertiary butyl peroctoate, was heated to 180° F. and 30 parts of methyl methacrylate were added over 15 minutes. After holding the reaction mixture for 30 minutes at 188° F. a mixture of 72 parts of VM & P naphtha, three parts of tertiary butyl peroctoate and 117 parts of methyl methacrylate was added over two hours at 182° F.–189° F. resulting in a stable dispersion.

Example 5

Into a reaction flask equipped as in Example 1 were added 208 parts of VM & P naphtha, 150 parts of butanol, 15 parts of tertiary butyl peroctoate and 7.5 parts of an ethyl cellulose obtained from Hercules, Inc., designated as T–200, having an ethoxy content of 49.0 weight percent and a 25° C. viscosity at 5 weight percent solids in a solution of 80 weight percent toluene/20 weight percent ethanol of 200 cps. This mixture was heated to 180° F. and a 15 minute addition of 150 parts of methyl methacrylate was carried out. Thirty minutes later with the temperature at 180° F. a two hour addition of a mixture of 592.5 parts of methyl methacrylate, 358 parts of VM & P naphtha, 15 parts of tertiary butyl peroctoate and four parts of lauryl mercaptan was begun. At the conclusion of this addition the resulting reaction mixture was held for an additional 115 minutes at 185° F. producing a dispersion having a solids content of 50.7 weight percent, a weight per gallon of 7.77 lbs., and a #2 spindle, 60 r.p.m., Brookfield, viscosity of 37.5 cps. at 25° C.

Example 6

A reaction flask equipped as in Example 1 was charged with 208 parts of VM & P naphtha, 150 parts of a high solvency hydrocarbon solvent having a boiling range of 364° F.–404° F., 15 parts of tertiary butyl peroctoate and 7.5 parts of ethyl cellulose as described in Example 5. This mixture was heated to 180° F. and held for 30 minutes. A 30 minute addition of 150 parts of methyl methacrylate was carried out and the resulting mixture was held for an additional 30 minutes. A mixture of 592.5 parts of methyl methacrylate, 358 parts of VM & P naphtha, 15 parts of tertiary butyl peroctoate and four parts of lauryl mercaptan was added over two hours at 180° F.–189° F. and the reaction mixture was then held at this same temperature for 1¼ hours. A smooth seed free dispersion resulted.

Example 7

Using the same procedure as in Example 6 a similar dispersion was prepared using, as the organic medium, a high flash VM & P naphtha having a boiling point range of 275° F.–340° F. This dispersion exhibited a solids content of 51.5 weight percent, a weight per gallon of 7.87 lbs., and a #4 spindle, 60 r.p.m., Brookfield, viscosity of 2,200 cps. at 25° C.

Example 8

Using the same procedure as in Example 6 a similar dispersion was prepared using as the organic medium an 85/15 weight percent mixture of VM & P naphtha/toluene. The resulting dispersion exhibited a solids content of 48.0 weight percent, a weight per gallon of 7.79 lbs. and a spindle #3, 30 r.p.m., Brookfield, viscosity of 1012 cps. at 25° C.

Example 9

350 parts of VM & P naphtha, 15 parts of tertiary butyl peroctoate, 15 parts of the ethyl cellulose described in Example 5 and 30 parts of a 50 weight percent VM & P naphtha solution of a poly lauryl methacrylate homopolymer having a Gardner-Holdt 25° C. viscosity of U–V were mixed in a reaction flask equipped as in Example 1 and heated to 180° F. After holding at this temperature for 30 minutes, 150 parts of methyl methacrylate were added over 15 minutes and the reactants were again held at the same temperature for 30 minutes. An addition of 570 parts of methyl methacrylate, 350 parts of VM & P naphtha, 15 parts of tertiary butyl peroctoate and four parts of lauryl mercaptan was carried out over two hours. The resulting reaction mixture was held at 187° F.–190° F. for 1¾ hours producing a dispersion having a solids content of 51 weight percent and a weight per gallon of 7.52 lbs.

The dispersions as prepared herein find use in virtually all areas of coating. For example they can be used in can coatings, coil coatings, appliance coatings, house paints and the like. However, special usefulness is found in the area of automobile coatings when high solids and quick solvent evaporation is desirable.

In using the above dispersions it is understood that most applications require that they be used as paints in their colored or pigmented form. These paints can be prepared from the above described dispersions by using pigmentation methods well known in the art. Included preferably in these formulations are from about 10 to 45 weight percent based on dispersion solids of a coalescing aid such as the monobutyl ether of diethylene glycol. These coalescing aids are added to aid in the formation of films at lower temperatures, i.e., 200° F.–275° F. Also desirably present is from about 5 to 40 weight percent based on dispersion solids of a plasticizer of the type usually used in solution acrylic lacquers or enamels. Examples include the alkyl phthalates such as dioctyl orthophthalate. The preferred area of application of the dispersion of this invention is in areas where metallic or aluminum flake pigments are used.

It is understood that the foregoing detailed description is given merely by way of illustration and that many variations can be made therein without departing from the spirit of this invention.

The embodiments of the invention in which an exclusive property or privilege is claimed are defined as follows:

1. A dispersion of a synthetic polymer consisting essentially of:
  (a) an organic liquid medium having a boiling point within the range of from about 100° F. to about 500° F.;

(b) a cellulosic precursor which is at least swollen by said medium and is represented by the general formula,

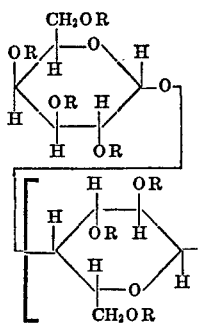

wherein R is selected from the group consisting of H, $C_1$–$C_{24}$ alkyl, $C_1$–$C_{24}$ hydroxyalkyl, $C_1$–$C_{24}$ alkyl hydroxy alkyl, $NO_2$ and

wherein $R^1$ is $C_1$–$C_{24}$ alkyl; and $n$ is an integer; and
(c) a dispersed, substantially medium-insoluble polymer, wherein not more than about 10% by weight of said polymer is soluble in said liquid medium, prepared from one or more ethylenically unsaturated monomers selected from at least one member of the group consisting of vinyl and allyl esters of fatty acids having from 1 to 18 carbon atoms; esters of acrylic acid and methacrylic acid, wherein the ester moiety contains from 1 to 18 carbon atoms and can be hydroxy-, N-alkylamino-, N,N-dialkylamino-substituted; monounsaturated monocarboxylic acids having from 3 to 5 carbon atoms; monounsaturated nitriles having from 3 to 5 carbon atoms; vinyl aromatic compounds; monounsaturated hydrocarbons having 2 to 3 carbon atoms; mono- and polyhalo-substituted monounsaturated hydrocarbons having 2 and 3 carbon atoms; vinyl sulfide; and vinyl pyrrolidone; wherein
(1) the ethylenically unsaturated monomers constituting (c) are polymerized in (a) in the presence of (b) and an initiator;
(2) (c) is dispersed in (a) and stabilized by (b);
(3) (b) is present in an amount ranging from about 0.2 to about 20 weight percent, based on the total amount of (b) and (c); and
(4) (b) has a molecular weight in the range of from about 300 to about 500,000.
2. A dispersion of a synthetic polymer, consisting essentially of:
(a) an organic liquid medium having a boiling point within the range of from about 100° F. to about 500° F.;
(b) a cellulosic precursor which is at least swollen by said medium and is represented by the general formula.

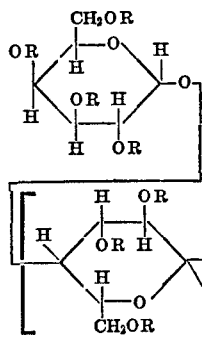
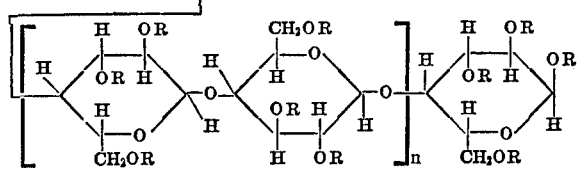

wherein R is selected from the group consisting of H, $C_1$–$C_{24}$ alkyl, $C_1$–$C_{24}$ hydroxyalkyl, $C_1$–$C_{24}$ alkyl hydroxy alkyl, $NO_2$, and

wherein $R^1$ is $C_1$–$C_{24}$ alkyl; and $n$ is an integer; and
(c) a dispersed, substantially medium-insoluble polymer, wherein not more than about 10% by weight of said polymer is soluble in said liquid medium, prepared from one or more ethylenically unsaturated monomers selected from the group consisting of alkyl acrylates and alkyl methacrylates, wherein the alkyl moieties contain from 1 to 18 carbon atoms; wherein
(1) the ethylenically unsaturated monomers constituting (c) are polymerized in (a) in the presence of (c) and an initiator;
(2) (c) is dispersed in (a) and stabilized by (b);
(3) (b) is present in an amount ranging from about 0.2 to about 20 weight percent, based on the total amount of (b) and (c); and
(4) (b) has a molecular weight in the range of from about 300 to about 500,000.
3. The dispersion of claim 1 wherein said R of said general formula of said precursor is selected from the group consisting of $C_1$–$C_{24}$ alkyl and

4. The dispersion of claim 2 wherein said R of said general formula of said precursor is selected from the group consisting of $C_1$–$C_{24}$ alkyl and

5. The dispersion of claim 1 wherein said precursor is cellulose acetate butyrate.
6. The dispersion of claim 2 wherein said precursor is cellulose acetate butyrate.
7. The dispersion of claim 1 wherein said precursor is ethyl cellulose.
8. The dispersion of claim 2 wherein said precursor is ethyl cellulose.
9. The dispersion of claim 1 wherein (b) is present in amount ranging from about 0.5 to about 5.0 weight percent, based on the total amount of (b) and (c).
10. The dispersion of claim 2 wherein (b) is present in amount ranging from about 0.5 to about 5.0 weight percent, based on the total amount of (b) and (c).
11. The dispersion of claim 1 wherein the ethylenically unsaturated monomers constituting (c) are polymerized in (a) in the presence of (c), an initiator and a chain-transfer agent.
12. The dispersion of claim 2 wherein the ethylenically unsaturated monomers constituting (c) are polymerized in (a) in the presence of (c), an initiator and a chain-transfer agent.

References Cited
UNITED STATES PATENTS

| | | | |
|---|---|---|---|
| 2,695,896 | 11/1954 | Ehring et al. | 260—17 A |
| 2,996,461 | 8/1961 | Kaufman et al. | 260—17 A |
| 3,082,179 | 3/1963 | Miller et al. | 260—17 A |
| 3,658,735 | 4/1972 | Nakao et al. | 260—17 A |
| 3,669,916 | 6/1972 | Nakao et al. | 260—17 A |
| 3,673,135 | 6/1972 | Blake et al. | 260—17 A |

LUCILLE M. PHYNES, Primary Examiner

U.S. Cl. X.R.
260—29.1 R, 89.5 A